(12) United States Patent
Liu et al.

(10) Patent No.: US 7,974,977 B2
(45) Date of Patent: Jul. 5, 2011

(54) SPECTRAL CLUSTERING USING SEQUENTIAL MATRIX COMPRESSION

(75) Inventors: Tie-Yan Liu, Beijing (CN); Bin Gao, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 686 days.

(21) Appl. No.: 11/743,942

(22) Filed: May 3, 2007

(65) Prior Publication Data

US 2008/0275862 A1 Nov. 6, 2008

(51) Int. Cl.
*G06F 7/00* (2006.01)
*G06F 17/30* (2006.01)
(52) U.S. Cl. ...................................... 707/737
(58) Field of Classification Search .................. 707/101, 707/6, 736, 737, 999.101, 999.006
See application file for complete search history.

(56) References Cited

U.S. PATENT DOCUMENTS

| | | | |
|---|---|---|---|
| 6,260,038 B1 | 7/2001 | Martin et al. | |
| 6,421,668 B1 | 7/2002 | Yakhini et al. | |
| 6,581,058 B1 | 6/2003 | Fayyad et al. | |
| 6,640,227 B1 | 10/2003 | Andreev | |
| 6,675,106 B1 * | 1/2004 | Keenan et al. | 702/28 |
| 6,735,589 B2 | 5/2004 | Bradley et al. | |
| 6,845,357 B2 | 1/2005 | Shetty et al. | |
| 7,003,509 B2 | 2/2006 | Andreev | |
| 7,743,058 B2 * | 6/2010 | Liu et al. | 707/737 |
| 2003/0041041 A1 * | 2/2003 | Cristianini | 706/12 |
| 2003/0174889 A1 | 9/2003 | Comaniciu et al. | |
| 2004/0078351 A1 | 4/2004 | Pascual-Marqui et al. | |
| 2004/0236573 A1 | 11/2004 | Sapeluk | |
| 2004/0267686 A1 * | 12/2004 | Chayes et al. | 707/1 |
| 2005/0270285 A1 * | 12/2005 | Zhou et al. | 345/420 |
| 2006/0004753 A1 * | 1/2006 | Coifman et al. | 707/6 |
| 2006/0065102 A1 | 3/2006 | Xu | |
| 2006/0074821 A1 * | 4/2006 | Cristianini | 706/12 |

OTHER PUBLICATIONS

Bo Chen et al., Fast Spectral Clustering of Data Using Sequential Matrix Compression, ECML 2006, LNAI 4212, pp. 590-596 publsihed Sep. 2006, springelink.com.*
U.S. Appl. No. 11/767, 626, Liu et al.
Brand, et al. "A Unifiying Theorem for Spectral Embedding and Clustering", Jan. 2003 (8 pages).
Ding. "Tutorial on Spectral Clustering", *ICML 2004*, University of California.
Hagen, et al. "New Spectral Methods for Ratio Cut Partitioning and Clustering", Department of Computer Science, University of California at Los Angeles, Los Angeles, CA, Manuscript received Jun. 9, 1991; Revised Dec. 12, 1991.

(Continued)

*Primary Examiner* — James Trujillo
*Assistant Examiner* — Jeffrey Burke
(74) *Attorney, Agent, or Firm* — Perkins Coie LLP (57) ABSTRACT

A clustering system generates an original Laplacian matrix representing objects and their relationships. The clustering system initially applies an eigenvalue decomposition solver to the original Laplacian matrix for a number of iterations. The clustering system then identifies the elements of the resultant eigenvector that are stable. The clustering system then aggregates the elements of the original Laplacian matrix corresponding to the identified stable elements and forms a new Laplacian matrix that is a compressed form of the original Laplacian matrix. The clustering system repeats the applying of the eigenvalue decomposition solver and the generating of new compressed Laplacian matrices until the new Laplacian matrix is small enough so that a final solution can be generated in a reasonable amount of time.

18 Claims, 6 Drawing Sheets

OTHER PUBLICATIONS

Knyazev. "Toward the Optimal Preconditioned Eigensolver: Locally Optimal Block Preconditioned Conjugate Gradient Method", *SIAM J. Sci. Comput.*, vol. 23, No. 2, Copyright 2001 for Industrial and Applied Mathematics (pp. 517-541).

Lang. "Newsweeder: Learning to filter netnews", *Proceedings of International Conference on Machine Learning*, pp. 331-339, Jul. 1995.

Shi, et al. "Normalized Cuts and Image Segmentation", *IEEE Transactions on Pattern Analysis and Machine Intelligence*, vol. 22, No. 8, Aug. 2000.

Sorensen. "Implicitly Restarted Arnoldi/Lanczos Methods for Large Scale Eigenvalue Calculations", *NASA Contractor Report 198342, ICASE Report No. 96-40, NASA Contract No. NAS1-19480*, May 1996.

White, et al. "A Spectral Clustering Approach to Finding Communities in Graphs", 2005 (12 pages).

Yang, et al. "A Survey of Conjugate Gradient Algorithims for Solution of Extreme Eigen-Problems of a Symmetric Matrix", *IEEE Transactions on Acoustics, Speech, and Signal Processing*, vol. 37, No. 10, Oct. 1989.

\* cited by examiner

SPECTRAL CLUSTERING USING SEQUENTIAL MATRIX COMPRESSION

BACKGROUND

The development of information systems, such as the Internet, and various online services for accessing the information systems, has led to the availability of increasing amounts of information. As computers become more powerful and versatile, users are increasingly employing their computers for a broad variety of tasks. Accompanying the increasing use and versatility of computers is a growing desire on the part of users to rely on their computing devices to perform their daily activities. For example, anyone with access to a suitable Internet connection may go "online" and navigate to the information pages (i.e., the web pages) to gather information that is relevant to the user's current activity.

Many search engine services, such as Google and Yahoo!, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how relevant the information of the web page may be to the search request based on the closeness of each match, web page importance or popularity (e.g., Google's PageRank), and so on. The search engine service then displays to the user links to those web pages in an order that is based on a ranking determined by their relevance.

Unfortunately, users of the information systems may encounter an information overload problem. For example, the search engine services often provide users a large number of search results, thus forcing the users to sift through a long list of web pages in order to find the relevant web pages.

Clustering techniques have been used to help organize objects that are similar or in some way related. These objects can include people, documents, web sites, events, news stories, and so on. For example, if the web pages of a search result are clustered based on similarity to one another, then the user can be presented with a list of the clusters, rather than a list of individual documents. As a result, the user will be presented with clusters of documents covering diverse topics on the first web page of the search result, rather a listing of individual documents that may all be very similar. Because of the large numbers of web-based objects (e.g., web pages, blocks of web pages, images of web pages, and web sites), it can be very computationally expensive to cluster such large numbers of objects.

Spectral clustering techniques have proved effective at clustering objects. The uses of spectral clustering has, however, been mainly restricted to small-scale problems because of the high computational complexity of spectral clustering. Spectral clustering represents the objects to be clustered and the relationship between the objects as a graph. A graph may be represented as $G=<V, E>$, where $V=\{1, 2, \ldots, n\}$ is the set of vertices and $E=\{<i, j>|i, j \in V\}$ is the set of edges. The relationship between objects can be represented by a relationship or adjacency matrix W, where $w_{ij}$ is set to one when there is a relationship from a source object i to a target object j. For example, the relationship matrix can represent a directed web graph in which the objects are web pages and the relationships represent links from a source web page to a target web page. As another example, the relationship matrix can represent an undirected document graph of a collection of documents in which the objects are documents and the relationships represent the similarity (e.g., cosine similarity) between the documents. The goal of spectral clustering is to identify clusters of related objects.

Spectral clustering can be described as partitioning a graph into two clusters and recursively applying the two-way partitioning to partition the graph into more clusters. The goal of spectral clustering is to partition the graph so that an objective function is minimized. One objective function may be to minimize the cut, that is, ensure that the relationships represented by the edges that are cut are minimized. Another objective function, referred to as "ratio cut," balances cluster sizes, and another objective function, referred to as "normalized cut," balances the cluster weights. The membership of the objects in the two clusters A and B can be represented by the following:

$$q_i = \begin{cases} 1 & \text{if } i \in A \\ -1 & \text{if } i \in B \end{cases}$$

where $q_i$ represents the cluster that contains object i. If $q_i$ is 1, then the object is in cluster A; and if $q_i$ is $-1$, then the object is in cluster B. The objective function can be represented by the following:

$$\begin{aligned} J &= CutSize \\ &= \frac{1}{4} \sum_{i,j} w_{ij} [q_i - q_j]^2 \\ &= \frac{1}{4} \sum_{i,j} w_{ij} [q_i^2 - q_j^2 - 2q_i q_j] \\ &= \frac{1}{2} \sum_{i,j} q_i [d_i \delta_{ij} - w_{ij}] q_j \\ &= \frac{1}{2} q^T (D - W) q \end{aligned}$$

where J represents the objective function to be minimized. If $q_i$ is represented as continuous values, rather than discrete values, then the solution to the object function is represented by the eigenvectors of the following:

$$(D-W)q = \lambda q$$

where q represents an eigenvector and $\lambda$ represents an eigenvalue. The Laplacian matrix of the graph is represented as follows:

$$L = D - W$$

Since the Laplacian is semi-positive definite, then the following holds for any value of x:

$$x^T L x \geq 0$$

The first eigenvector and the first eigenvalue are represented as follows:

$$q_1 = (1, \ldots, 1)^T = e^T$$

$$\lambda_1 = 0$$

The second eigenvector $q_2$ represents the solution, and the smaller the second eigenvalue $\lambda_2$ the more accurate the solution. Thus, $q_2$ contains an element for each object and the object i is in cluster A if $q_1$ is greater than zero, and in cluster B otherwise.

Traditionally, spectral clustering first performs an eigenvalue decomposition ("EVD") and then some heuristics such as k-means are applied to the eigenvectors to obtain the discrete clusters. Unfortunately, eigenvalue decomposition is computationally expensive. For example, the Lanczos algorithm is $O(mn^2k)$ and the preconditioned conjugate gradient ("CG-based") algorithm is $O(n^2k)$, where k is the number of the eigenvectors used, n is the number of data points, and m is the number of iteration steps. (See Sorensen, D. C., "Implicitly Restarted Arnoldi/Lanczos Methods for Large-Scale Eigenvalue Computations," Technical Report, TR-96-40, 1996, and Knyazev, A. V., "Toward the Optimal Preconditioned Eigensolver: Locally Optimal Block Preconditioned Conjugate Gradient Method," SIAM Journal on Scientific Computing, vol. 23, no. 2, pp. 517-541, 2001.)

SUMMARY

A method and system for clustering objects having relationships by compressing a matrix representing the objects and their relationships is provided. A clustering system generates an original Laplacian matrix representing objects and their relationships. The clustering system initially applies an eigenvalue decomposition solver to the original Laplacian matrix for a number of iterations. After the solver is applied for a few iterations, some elements of the resultant second eigenvector will typically become relatively stable and would not change much in subsequent iterations. The clustering system identifies the elements of the resultant eigenvector that are stable. The clustering system then aggregates the elements of the original Laplacian matrix corresponding to the identified stable elements. The clustering system generates a new Laplacian matrix that is a compressed form of the original Laplacian matrix so that the second eigenvalues of both matrices are the same. The clustering system then applies the eigenvalue decomposition solver to the new Laplacian matrix for a number of iterations. The clustering system repeats the applying of the eigenvalue decomposition solver and the generating of new compressed Laplacian matrices until the new Laplacian matrix is small enough so that a final solution can be generated in a reasonable amount of time. The identified stable elements and the eigenvector of the final Laplacian matrix represent an approximation of the second eigenvector of the original Laplacian matrix that indicates the clustering of the objects.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for clustering objects having relationships by compressing a matrix representing the objects and their relationships is provided. In one embodiment, a clustering system generates an original Laplacian matrix representing objects and their relationships. The clustering system generates the original Laplacian matrix from an adjacency matrix representing a graph with vertices representing the objects and edges representing the relationships between the objects. For example, the graph may be a web graph with web pages as objects and links between web pages as relationships. The graph may also be, for example, a document graph with documents as the objects and similarity scores indicating the relationships between the documents. The clustering system initially applies an eigenvalue decomposition solver (e.g., a CG-based solver) to the original Laplacian matrix for a number of iterations. Because the number of objects may be very large (e.g., millions in the case of web pages), it would be very computationally expensive to apply the eigenvalue decomposition solver for the number of iterations needed to reach a final solution. Thus, the clustering system initially applies the solver for a relatively small number of iterations.

After the solver is applied for a few iterations, some elements of the resultant second eigenvector will typically become relatively stable and would not change much in subsequent iterations. The clustering system identifies the elements of the resultant eigenvector that are stable. The clustering system then aggregates the elements of the original Laplacian matrix corresponding to the identified stable elements. The clustering system generates a new Laplacian matrix that is a compressed form of the original Laplacian matrix. The new Laplacian matrix has a few aggregated elements (e.g., rows and columns) representing the stable elements and elements from the original Laplacian matrix representing the elements not identified as being stable. The clustering system generates the aggregated values so that in the new Laplacian matrix the sum of the elements of each row and column is zero and the square of the sum of the elements of each row and column is one, which are required conditions of a Laplacian matrix. The clustering system generates the new, compressed Laplacian matrix so that the second eigenvalues of both matrices are the same. If the elements that are identified as being stable were actually completely stable, then the second eigenvalue and second eigenvector for the original Laplacian matrix and the new Laplacian matrix would be identical. However, since the elements identified as being stable may not be quite stable, the eigenvalues and eigenvectors may be slightly different. Nevertheless, the eigenvalue and eigenvector of the new Laplacian matrix may be a good approximation of those of the original Laplacian matrix. The clustering system then applies the eigenvalue decomposition solver to the new Laplacian matrix for a number of iterations. The clustering system repeats the applying of the eigenvalue decomposition solver and the generating of new compressed Laplacian matrices until the new Laplacian matrix is small enough so that a final solution can be generated in a reasonable amount of time. The identified stable elements and the eigenvector of the final Laplacian matrix represent an approximation of the second eigenvector of the original Laplacian matrix that indicates the clustering of the objects.

In one embodiment, the clustering system performs a two-way partition using a ratio-cut objective function. Alternatively, a normalized cut objective function may be used. The system generates the original Laplacian matrix as follows:

$$L=D-W$$

wherein $L=\{l_{ij}\}$ represents an n×n Laplacian matrix generated from the graph of vertices and edges, n represents the number of objects, W represents the adjacency matrix, and D represents a diagonal matrix with the sum of each row of W assigned to its corresponding diagonal positions. The system represents the two-way ratio-cut spectral clustering as follows:

$$\min \xi^T L\xi \text{ subject to } \xi^T\xi=1, \xi^T e=0 \quad (1)$$

where $\xi$ represents an underlying n-dimensional embedding vector or eigenvector for clustering. This optimization problem is equivalent to finding the eigenvector associated with the second-smallest eigenvalue of the eigenvalue decomposition as represented by the following:

$$L\xi=\lambda\xi \quad (2)$$

The system repeatedly performs the eigenvalue decomposition using a CG-based eigenvalue decomposition solver for a number of iterations and then identifies the stable elements of the embedding vector. The system then generates a compressed matrix as described below and repeats the eigenvalue decomposition for a number of iterations on the compressed matrix. When the compressed matrix is small enough, the system performs the eigenvalue decomposition until completion and then calculates the eigenvector to give the partition of the objects.

The system compresses the matrix after each repeated eigenvalue decomposition for the number of iterations. After each decomposition, the system identifies the stable elements where k represents the number of unstable elements and n–k represents the number of stable elements. To identify a stable element, the system identifies a certain percentage of the objects with top positive values in the embedding vector and a certain percentage of the objects with top negative values. If the absolute value of an element's gradient is less than a small threshold (e.g., 0.001), the system regards the element as a stable element.

The system then compresses the data representing the stable elements. The system reorganizes the rows and columns of the Laplacian matrix L as represented by the following:

$$L = \begin{matrix} n-k \\ k \end{matrix} \begin{bmatrix} \overset{n-k}{L_{11}} & \overset{k}{L_{12}} \\ L_{21} & L_{22} \end{bmatrix} \xRightarrow{compress} \hat{L} = \begin{matrix} 2 \\ k \end{matrix} \begin{bmatrix} \overset{2}{\hat{L}_{11}} & \overset{k}{\hat{L}_{12}} \\ \hat{L}_{21} & \hat{L}_{22} \end{bmatrix} \quad (3)$$

The left side of Equation 3 illustrates that the first n–k rows and columns correspond to the stable elements, which are to be fixed in the subsequent iterations, and the remaining k rows and columns correspond to the unfixed elements. Since a Laplacian matrix is symmetrical, $L_{12}{}^T=L_{21}$. After applying the matrix compression, the n–k stable elements are merged to an aggregated positive point and an aggregated negative point. The system thus compresses L into a (k+2)×(k+2) matrix $\hat{L}=\{\hat{l}_{ij}\}$ as represented by the right side of Equation 3. To maintain the symmetry of $\hat{L}$, the system sets $\hat{L}_{12}{}^T=\hat{L}_{21}$. Since the matrix compression does not change the interrelations between the unfixed points, $L_{22}$ remains unchanged in $\hat{L}$. The sub-matrices of $\hat{L}$ are referred to as an upper-left sub-matrix $\hat{L}_{11}$, an upper-right sub-matrix $\hat{L}_{12}$, a lower-left sub-matrix $\hat{L}_{21}$, and a lower-right sub-matrix $\hat{L}_{22}$.

After the compression of the Laplacian matrix, the original spectral clustering problem of Equation 1 is converted to a smaller-scaled spectral clustering problem represented by the following:

$$\min \hat{\xi}^T\hat{L}\hat{\xi} \text{ subject to } \hat{\xi}^T\hat{\xi}=1, \hat{\xi}^T e=0 \quad (4)$$

where $\hat{\xi}$ represents a k+2-dimensional embedding vector. Again, the solution to Equation 4 is the eigenvector corresponding to the second-smallest eigenvalue of the eigenvalue decomposition represented as follows:

$$\hat{L}\hat{\xi}=\hat{\lambda}\hat{\xi} \quad (5)$$

The system may represent $\xi$ and $\hat{\xi}$ by $\xi=[\xi_1\ \xi_2]^T$ and $\hat{\xi}=[\hat{\xi}_1\ \hat{\xi}_2]^T$. The system attempts to keep the second-smallest eigenvalues of L and $\hat{L}$ equal to each other and to keep the embedding values of the unfixed elements calculated from L and $\hat{L}$ the same, i.e., to keep $\hat{\lambda}=\lambda$ and $\hat{\xi}_2=\xi_2$.

The system calculates values for $\hat{L}_{11}$, $\hat{L}_{12}$, and $\hat{L}_{21}$ so that the solution derived using a compressed matrix will be close to the solution that would have been derived using an uncompressed matrix. The constraints of the original optimization problem represented by Equation 1 and the constraints of the new optimization problem can be represented as follows:

$$\xi_1^T\xi_1+\xi_2^T\xi_2=1, \hat{\xi}_1^T\hat{\xi}_2=1 \Rightarrow \hat{\xi}_1^T\hat{\xi}_1=\xi_1^T\xi_1$$

$$\xi_1^T e+\xi_2^T e=0, \hat{\xi}_1^T e+\hat{\xi}_2^T e=0 \Rightarrow \hat{\xi}_1^T e=\xi_1^T e \quad (6)$$

where $\hat{\xi}_2=\xi_2$. To fix the stable elements in the embedding vector of the original problem to some discrete values, the system represents the stable portion of the compressed embedding vector as $\hat{\xi}_1=(a,-b)^T$, $a>0, b>0, \xi_1=(c_1,c_2,\ldots,c_{n-k})^T$ and represents the elements of the diagonal matrix as $$d_1 = \xi_1^T\xi_1 = \sum_{i=1}^{n-k} c_i^2, \quad d_2 = \xi_1^T e = \sum_{i=1}^{n-k} c_i.$$

The system then substitutes these representations into Equation 6, resulting in a solution represented as follows:

$$a=(d_2+\sqrt{2d_1-d_2^2})/2, \ b=(-d_2+\sqrt{2d_1-d_2^2})/2 \quad (7)$$

The system can then compute $\hat{\xi}_1$ using Equation 7 based on $\xi_1$, as a necessary condition to guarantee $\hat{\xi}_2=\xi_2$.

By decomposing the matrices in Equations 2 and 5 into sub-matrices, and considering $\hat{\lambda}=\lambda$ and $\hat{\xi}_2=\xi_2$ the system represents the following:

$$L_{11}\xi_1+L_{12}\xi_2=\lambda\xi_1 \text{ (i)}$$

$$L_{21}\xi_1+L_{22}\xi_2=\lambda\xi_2 \text{ (ii)}$$

$$\hat{L}_{11}\hat{\xi}_1+\hat{L}_{12}\xi_2=\lambda\hat{\xi}_1 \text{ (iii)}$$

$$\hat{L}_{21}\hat{\xi}_1+L_{22}\xi_2=\lambda\xi_2 \text{ (iv)} \quad (8)$$

From Equations 8(ii) and 8(iv), the equivalences can be represented as follows:

$$\hat{L}_{21}\hat{\xi}_1 = L_{21}\xi_1 \qquad (9)$$

The system can represent Equation 9 as follows:

$$a\hat{l}_{i1} - b\hat{l}_{i2} = \sum_{j=1}^{n-k} c_j l_{(i+n-k-2),j}, \quad (i = 3, \ldots, k+2) \qquad (10)$$

Since the sum of each row and column of a Laplacian matrix should be zero, the system represents the sum of the first two elements of a row of the compressed matrix as follows:

$$\hat{l}_{i1} + \hat{l}_{i2} = \sum_{j=1}^{n-k} l_{(i+n-k-2),j}, \quad (i = 3, \ldots, k+2) \qquad (11)$$

A solution to the equation set of Equations 10 and 11 can be represented as follows:

$$\hat{l}_{i1} = \left[\sum_{j=1}^{n-k} (b + c_j) l_{(i+n-k-2),j}\right] / (a+b)$$

$$\hat{l}_{i2} = \left[\sum_{j=1}^{n-k} (a - c_j) l_{(i+n-k-2),j}\right] / (a+b), \quad (i = 3, \ldots, k+2) \qquad (12)$$

As represented by Equation 12, the weights between the two aggregated elements and the unfixed elements are linear combinations of the weights between the original fixed elements and the unfixed elements. Thus, the system can efficiently calculate $\hat{L}_{12}$ and $\hat{L}_{21}$ based on the embedding vector $\xi_1$ and the Laplacian matrix L using Equation 12.

Since the sum of the elements of a column of a Laplacian matrix is zero, the first two columns of $\hat{L}$ should also be zeros as represented by the following:

$$\hat{l}_{11} + \hat{l}_{21} = -\sum_{i=3}^{k+2} \hat{l}_{i1} \qquad (13)$$

$$= -\left[\sum_{i=n-k+1}^{n} \sum_{j=1}^{n-k} (b + c_j) l_{ij}\right] / (a+b)$$

$$= -[be^T L_{21} e + e^T L_{21} \xi_1] / (a+b)$$

$$\hat{l}_{12} + \hat{l}_{22} = -\sum_{i=3}^{k+2} \hat{l}_{i2}$$

$$= -\left[\sum_{i=n-k+1}^{n} \sum_{j=1}^{n-k} (a - c_j) l_{ij}\right] / (a+b)$$

$$= -[ae^T L_{21} e - e^T L_{21} \xi_1] / (a+b)$$

$$\hat{l}_{21} + \hat{l}_{12}$$

Since there are four unknown quantities and three equations in Equation 13, the system adds an additional equation to the equation set as represented by the following:

$$\xi^T L \xi = \hat{\xi}^T \hat{L} \hat{\xi} \qquad (14)$$

By decomposing the matrices and vectors of Equation 14 into sub-matrices and considering Equation 9, a decomposition can be represented as follows:

$$\xi_1^T L_{11} \xi_1 = \hat{\xi}_1^T \hat{L}_{11} \hat{\xi}_1 \qquad (15)$$

Substituting the notations $\hat{\xi}_1, \xi_1, d_1, d_2$ into Equation 15 results in the following:

$$a^2 \hat{l}_{11} - 2ab(\hat{l}_{12} + \hat{l}_{21}) + b^2 \hat{l}_{22} = \xi_1^T L_{11} \xi_1 \qquad (16)$$

Thus, by adding Equation 16 to the equation set of Equation 13, a solvable equation set is represented by the following:

$$\hat{l}_{11} = [\xi_1^T L_{11} \xi_1 - 2be^T L_{21} \xi_1 - b^2 e^T L_{21} e]/(a+b)^2$$

$$\hat{l}_{12} = \hat{l}_{21} = -[\xi_1^T L_{11} \xi_1 + (a-b)e^T L_{21} \xi_1 + abe^T L_{21} e]/(a+b)^2 \qquad (17)$$

$$\hat{l}_{22} = [\xi_1^T L_{11} \xi_1 + 2ae^T L_{21} \xi_1 - a^2 e^T L_{21} e]/(a+b)^2$$

Figure 1:
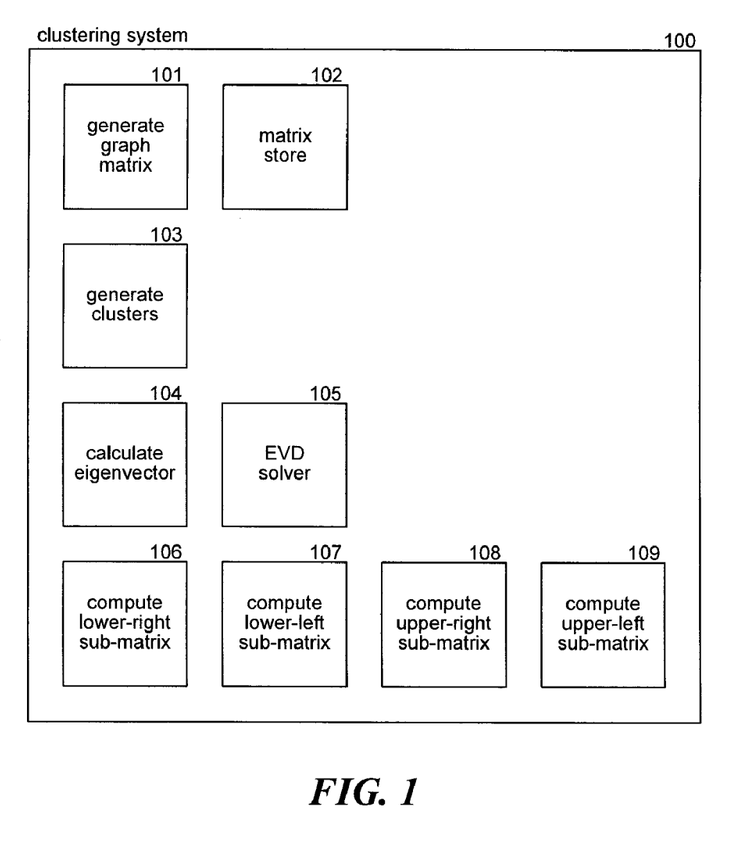
FIG. 1 is a diagram that illustrates components of the clustering system in one embodiment.

FIG. 1 is a diagram that illustrates components of the clustering system in one embodiment. The clustering system 100 includes a generate graph matrix 101 and a matrix store 102. The generate graph matrix component generates an adjacency matrix representing a graph of objects and their relationships. The generate graph matrix component stores the adjacency matrix in the matrix store. The clustering system also includes a generate clusters component 103, a calculate eigenvector component 104, and an eigenvalue decomposition solver 105. The generate clusters component invokes the calculate eigenvector component to generate a second eigenvector for the adjacency matrix. The calculate eigenvector component repeatedly invokes the eigenvalue decomposition solver for a few iterations, identifies stable elements of the second eigenvector, and generates a compressed Laplacian matrix until the compressed Laplacian matrix is small enough to have a final solution calculated using the eigenvalue decomposition solver. The stable elements and the final second eigenvector represent the clustering of the objects. The calculate eigenvector component invokes a compute lower-right sub-matrix component 106, a compute lower-left sub-matrix component 107, a compute upper-right sub-matrix component 108, and a compute upper-left sub-matrix component 109 to generate the compressed Laplacian matrix.

The computing device on which the clustering system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the clustering system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented and used in various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The clustering system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, a separate computing system may crawl the web and generate an adjacency matrix representing a web graph or may generate a similarity matrix indicating similarity between pairs of documents.

Figure 2:
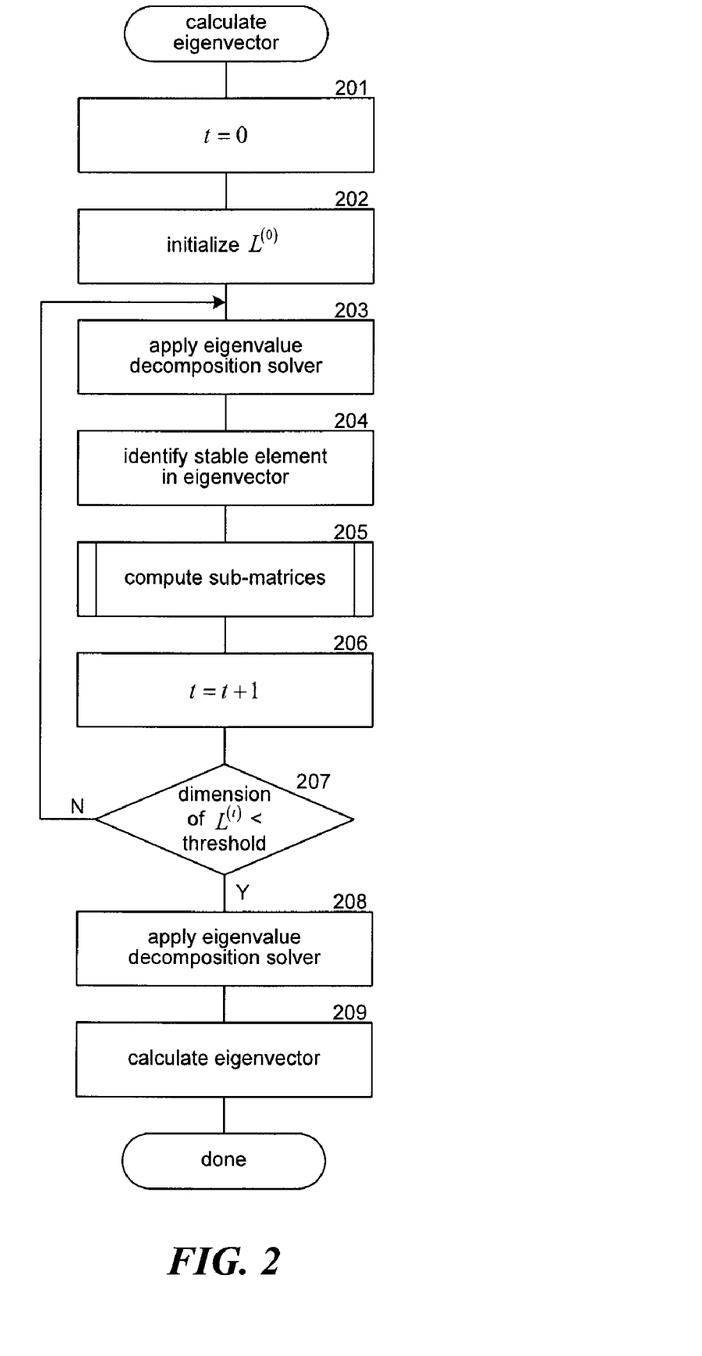
FIG. 2 is a flow diagram that illustrates the processing of the calculate eigenvector component of the clustering system in one embodiment.

FIG. 2 is a flow diagram that illustrates the processing of the calculate eigenvector component of the clustering system in one embodiment. The component calculates the second eigenvector for the Laplacian matrix. In block 201, the component initializes the iterations of the component. In block 202, the component initializes the original Laplacian matrix to the matrix of the matrix store. In blocks 203-207, the component loops compressing the Laplacian matrix until the dimensions of the compressed Laplacian matrix are less than a threshold. In block 203, the component applies the eigenvalue decomposition solver for a few iterations and identifies the second eigenvector. In block 204, the component identifies stable elements of the second eigenvector. In block 205, the component invokes the compute sub-matrices component to generate the compressed Laplacian matrix. In block 206, the component increments the number of iterations. In decision block 207, if the dimensions of the compressed Laplacian matrix are less than a threshold number of elements, then the component continues at block 208, else the component loops to block 203 to perform the next iteration. In block 208, the component applies the eigenvalue decomposition solver to the Laplacian matrix to generate a final solution. In block 209, the component calculates the second eigenvector corresponding to the second eigenvalue and then completes.

Figure 3:
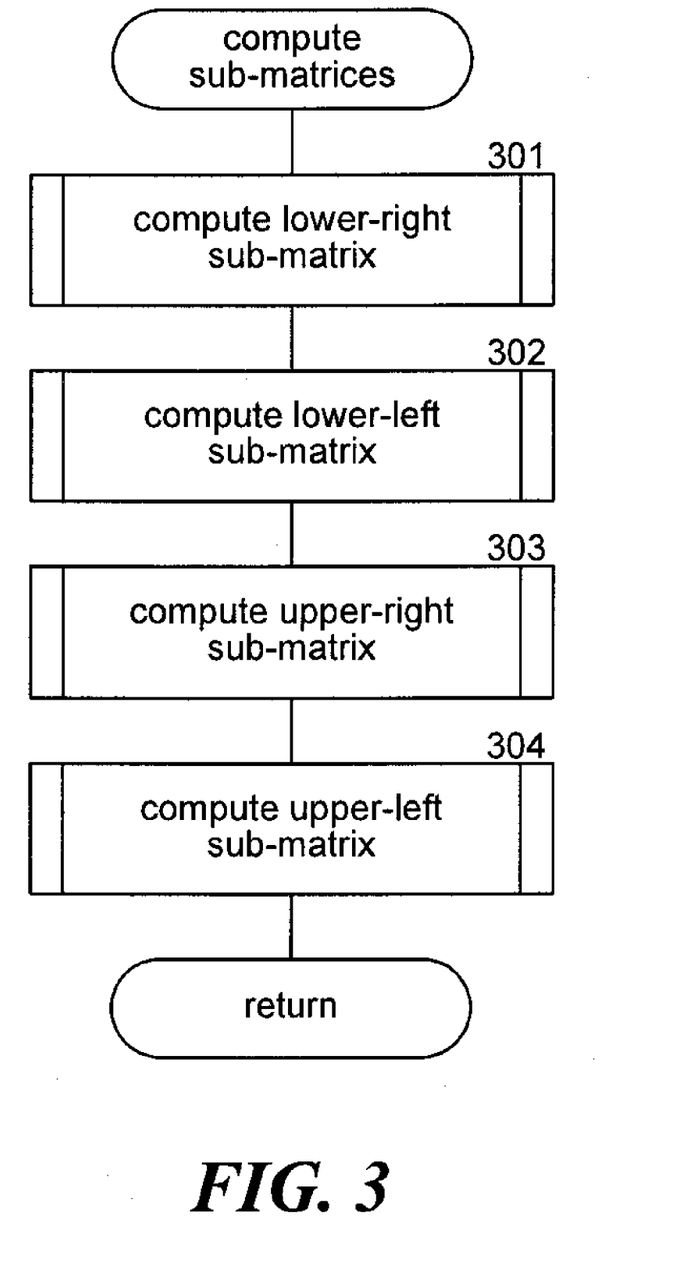
FIG. 3 is a flow diagram that illustrates the processing of the compute sub-matrices component of the clustering system in one embodiment.

FIG. 3 is a flow diagram that illustrates the processing of the compute sub-matrices component of the clustering system in one embodiment. The component invokes various components to generate sub-matrices of the compressed Laplacian matrix. In block 301, the component invokes the compute lower-right sub-matrix component. In block 302, the component invokes the compute lower-left sub-matrix component. In block 303, the component invokes the compute upper-right sub-matrix component. In block 304, the component invokes the compute upper-left sub-matrix component and then returns.

Figure 4:
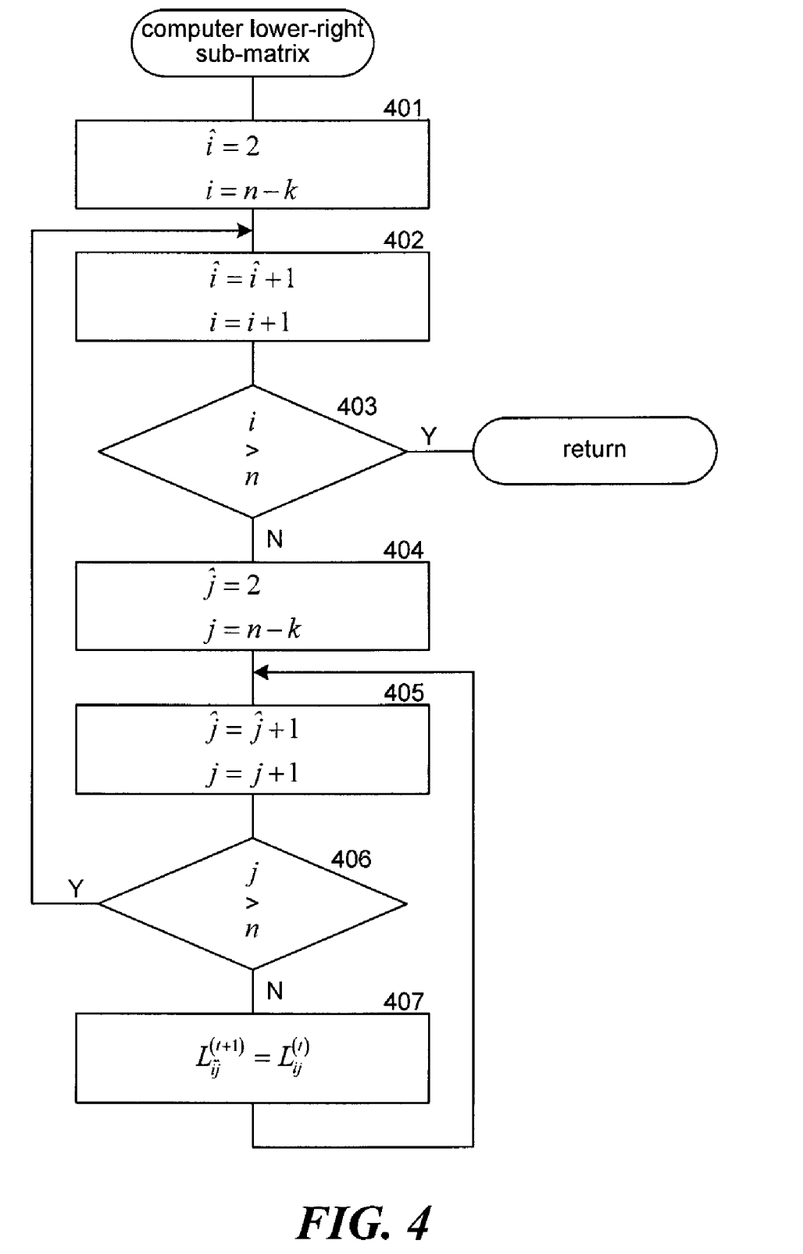
FIG. 4 is a flow diagram that illustrates the processing of the compute lower-right sub-matrix component of the clustering system in one embodiment.

FIG. 4 is a flow diagram that illustrates the processing of the compute lower-right sub-matrix component of the clustering system in one embodiment. The component sets the lower-right sub-matrix to the elements of the previous Laplacian matrix corresponding to the elements that were not identified as being stable. In block 401, the component initializes the row indexes for the new Laplacian matrix and the previous Laplacian matrix. In blocks 402-407, the component loops initializing the lower-right sub-matrix of the new Laplacian matrix. In block 402, the component increments the row indices for the Laplacian matrices. In decision block 403, if the row index for the rows of the previous Laplacian matrix is greater than the number of rows in the matrix, then the component returns, else the component continues at block 404. In block 404, the component initializes a column index for the new Laplacian matrix and the previous Laplacian matrix. In blocks 405-407, the component loops setting the values of each column for the selected row. In block 405, the component increments the index of the column of the new Laplacian matrix and the original Laplacian matrix. In decision block 406, if the index of columns is greater than the number of columns in the previous Laplacian matrix, then the component loops to block 402 to increment the next row, else the component continues at block 407. In block 407, the component sets the value within the lower-right sub-matrix of the new Laplacian matrix and then loops to block 405 to select the next column.

Figure 5:
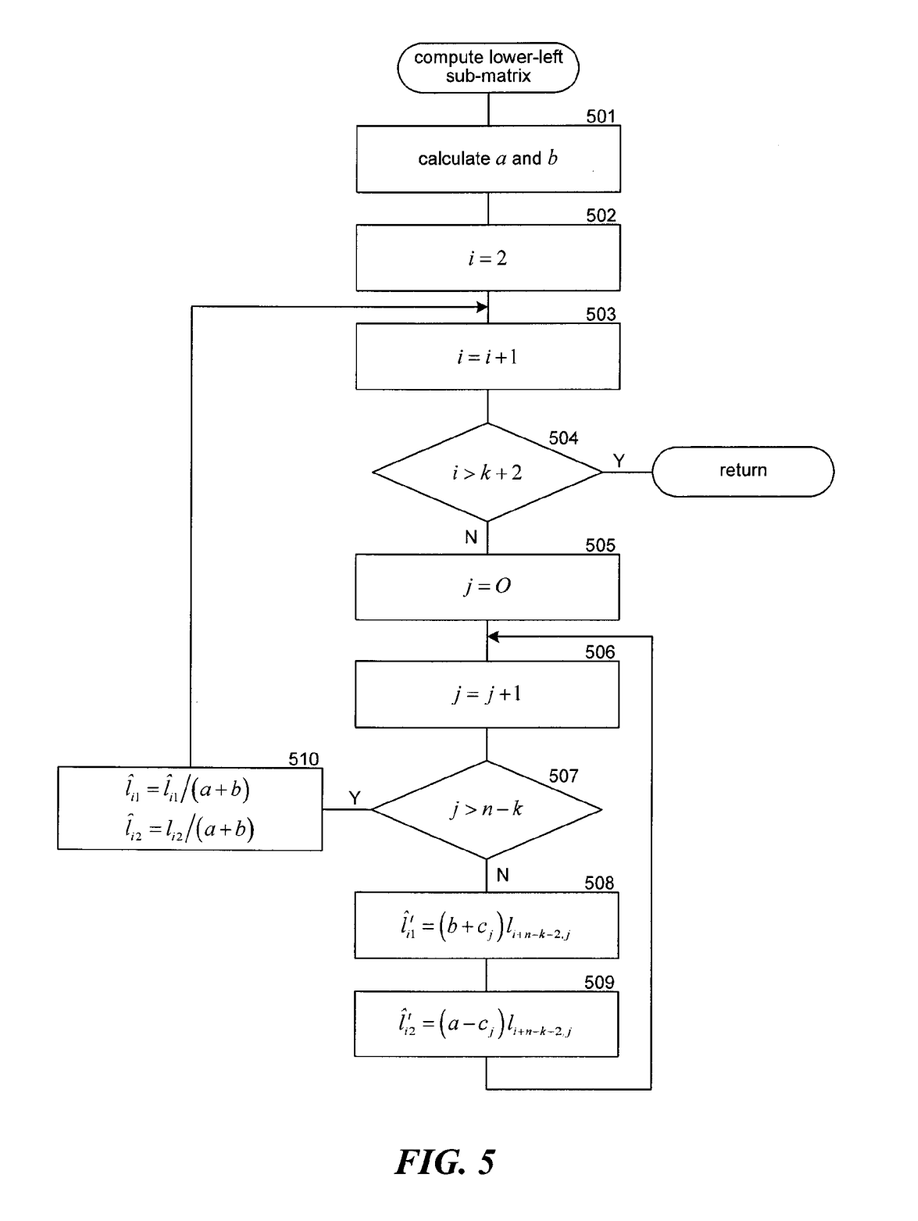
FIG. 5 is a flow diagram that illustrates the processing of the compute lower-left sub-matrix component of the clustering system in one embodiment.

FIG. 5 is a flow diagram that illustrates the processing of the compute lower-left sub-matrix component of the clustering system in one embodiment. The component sets the values of the lower-left sub-matrix as indicated by Equation 12. Although not shown, the compute upper-right sub-matrix component sets the sub-matrix to the transform of the lower-left sub-matrix. In block 501, the component calculates the values according to Equation 7. In block 502, the component sets the row index for the new Laplacian matrix. In block 503, the component increments the row index. In decision block 504, if the row index is greater than the number of dimensions of the new Laplacian matrix, then the component returns, else the component continues at block 505. In block 505, the component initializes the column index. In block 506, the component increments the column index. In decision block 507, if the column index is greater than the number of stable elements, then the component continues at block 510, else the component continues at block 508. In block 508, the component accumulates the element of the first column for the selected row. In block 509, the component accumulates the element of the second column for the selected row. The component then loops to block 506 to increment to the next column of the new Laplacian matrix. In block 510, the component adjusts the accumulated values and then loops to block 501 to increment the next row.

Figure 6:
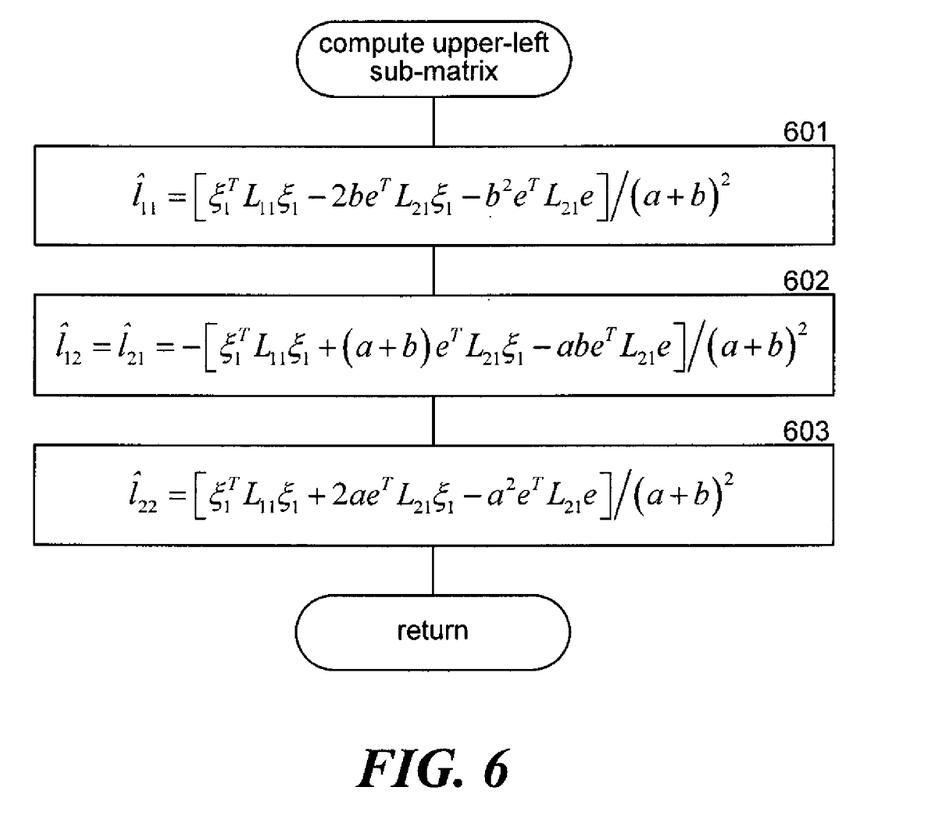
FIG. 6 is a flow diagram that illustrates the processing of the compute upper-left sub-matrix component of the clustering system in one embodiment.

FIG. 6 is a flow diagram that illustrates the processing of the compute upper-left sub-matrix component of the clustering system in one embodiment. In block 601, the component sets the upper-left element of the sub-matrix. In block 602, the component sets the lower-left element and the upper-right element of the sub-matrix. In block 603, the component sets the lower-right element of the sub-matrix and then returns.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The clustering system may be used by various applications (e.g., search engines, information retrieval systems) to cluster objects of various types with relationships. Accordingly, the invention is not limited except as by the appended claims.

We claim:

1. A method in a computing device for clustering objects having relationships, the method comprising:
generating an original Laplacian matrix representation of a graph with vertices representing the objects and edges representing the relationships;
applying an eigenvalue decomposition solver to the original Laplacian matrix for a number of iterations;
identifying stable elements of an eigenvector resulting from the applying of the solver;
aggregating elements of the original Laplacian matrix corresponding to the identified stable elements;
generating a compressed Laplacian matrix from the aggregated elements and elements of the original Laplacian matrix corresponding to the elements not identified as stable; and
applying an eigenvalue decomposition solver to the compressed Laplacian matrix to arrive at a solution wherein the resulting eigenvector represents a clustering of the objects
wherein the objects are documents; and wherein the aggregating of the elements generates aggregate values so that the subsequent applying of the eigenvalue decomposition solver to the compressed Laplacian matrix results in a second eigenvalue that is same as the second eigenvalue of the uncompressed Laplacian matrix except for a stable element not being completely stable.

2. The method of claim 1 wherein the compressed Laplacian matrix includes an upper-left sub-matrix, an upper-right sub-matrix, a lower-left sub-matrix, and a lower-right sub-matrix wherein the elements of the upper-left sub-matrix, the upper-right sub-matrix, and the lower-left sub-matrix are aggregated elements based on the identified stable elements of the eigenvector and the elements of the lower-right sub-matrix are the elements of the lower-right sub-matrix of the uncompressed Laplacian matrix for the elements not identified as being stable.

3. The method of claim 2 wherein the values of the upper-left sub-matrix are represented by the following:

$$\hat{l}_{11} = [\xi_1{}^T L_{11} \xi_1 - 2be^T L_{21} \xi_1 - b^2 e^T L_{21} e]/(a+b)^2$$

$$\hat{l}_{12} = \hat{l}_{21} = -[\xi_1{}^T L_{11} \xi_1 + (a+b)e^T L_{21} \xi_1 - abe^T L_{21} e]/(a+b)^2$$

$$\hat{l}_{22} = [\xi_1{}^T L_{11} \xi_1 2ae^T L_{21} \xi_1 - a^2 e^T L_{21} e]/(a+b)^2.$$

4. The method of claim 2 wherein the values of the lower-left sub-matrix are represented by the following:

$$\hat{l}_{i1} = \left[\sum_{j=1}^{n-k} (b+c_j) l_{(i+n-k-2),j}\right] \Big/ (a+b)$$

$$\hat{l}_{i2} = \left[\sum_{j=1}^{n-k} (a-c_j) l_{(i+n-k-2),j}\right] \Big/ (a+b)$$

, $(i = 3, \ldots, k+2)$.

5. The method of claim 4 wherein the values of the upper-right sub-matrix are represented by a transform of the lower-left sub-matrix.

6. The method of claim 1 wherein the applying of an eigenvalue decomposition solver to the compressed Laplacian matrix is performed for a certain number of iterations and then repeatedly identifies stable elements of an eigenvector resulting from applying the solver for a number of iterations, aggregates elements of the compressed Laplacian matrix corresponding to the identified stable elements, generates a further compressed Laplacian matrix from the aggregated elements and elements of the previously compressed Laplacian matrix corresponding to the elements not identified as stable, and applies an eigenvalue decomposition solver to the further compressed Laplacian matrix for a number of iterations until the eigenvalue decomposition solver arrives at a final solution.

7. The method of claim 1 wherein the documents are web pages and the relationships between the web pages are links from a source web page to a target web page.

8. The method of claim 1 wherein the relationships between the documents are document similarity scores.

9. The method of claim 1 wherein the eigenvalue decomposition solver is a conjugate gradient solver.

10. The method of claim 1 wherein the eigenvector is the second eigenvector.

11. A computer-readable medium encoded with instructions for controlling a computing device to cluster objects having relationships, by a method comprising:
generating a Laplacian matrix representation of a graph with vertices representing the objects and edges representing the relationships;
repeatedly
applying an eigenvalue decomposition solver to a current Laplacian matrix for a number of iterations;
identifying elements of an eigenvector resulting from applying the solver as being stable;
aggregating elements of the current Laplacian matrix corresponding to the identified stable elements; and
generating a new current Laplacian matrix from the aggregated elements and elements of the previous current Laplacian matrix corresponding to the elements not identified as being stable until a size of the new current Laplacian matrix is less than a threshold; and
applying an eigenvalue decomposition solver to the new current Laplacian matrix to arrive at a final solution wherein the resulting eigenvector represents a clustering of the objects
wherein the objects are web pages and the relationships between the web pages are links from a source web page to a target web page, and
wherein the aggregating of the elements generates aggregate values so that the subsequent applying of the eigenvalue decomposition solver to the new current Laplacian matrix results in a second eigenvalue that is substantially the same as the second eigenvalue of the previous current Laplacian matrix except for a stable element not being completely stable.

12. The computer-readable medium of claim 11 wherein a new current Laplacian matrix includes an upper-left sub-matrix, an upper-right sub-matrix, a lower-left sub-matrix, and a lower-right sub-matrix wherein the elements of the upper-left sub-matrix, the upper-right sub-matrix, and the lower-left sub-matrix are aggregated elements based on the identified stable elements of the eigenvector and the previous current Laplacian matrix and the elements of the lower-right sub-matrix are elements of the lower-right sub-matrix of the previous current Laplacian matrix for the elements not identified as being stable.

13. The computer-readable medium of claim 12 wherein the values of the upper-left sub-matrix are represented by the following:

$$\hat{l}_{11} = [\xi_1{}^T L_{11} \xi_1 - 2be^T L_{21} \xi_1 - b^2 e^T L_{21} e]/(a+b)^2$$

$$\hat{l}_{12} = \hat{l}_{21} = -[\xi_1{}^T L_{11} \xi_1 + (a+b)e^T L_{21} \xi_1 - abe^T L_{21} e]/(a+b)^2$$

$$\hat{l}_{22} = [\xi_1{}^T L_{11} \xi_1 2ae^T L_{21} \xi_1 - a^2 e^T L_{21} e]/(a+b)^2.$$

14. The computer-readable medium of claim 12 wherein the values of the lower-left sub-matrix are represented by the following:

$$\hat{l}_{i1} = \left[\sum_{j=1}^{n-k} (b+c_j) l_{(i+n-k-2),j}\right] \Big/ (a+b)$$

$$\hat{l}_{i2} = \left[\sum_{j=1}^{n-k} (a-c_j) l_{(i+n-k-2),j}\right] \Big/ (a+b)$$

, $(i = 3, \ldots, k+2)$.

15. The computer-readable medium of claim 14 wherein the values of the upper-right sub-matrix are represented by a transform of the lower-left sub-matrix.

16. A computing device for clustering objects having relationships, comprising:
a data store having a Laplacian matrix representation of a graph with vertices representing the objects and edges representing the relationships;

a memory storing computer-executable instructions of:
  a component that applies an eigenvalue decomposition solver to a Laplacian matrix for a number of iterations;
  a component that identifies stable elements of an eigenvector resulting from the component that applies, an element being stable when the absolute value of its gradient is less than a threshold gradient;
  a component that aggregates elements of a Laplacian matrix corresponding to the identified stable elements;
  a component that generates a Laplacian matrix from the aggregated elements and elements of the previous Laplacian matrix corresponding to the elements not identified as stable, such that a single aggregate element represents multiple stable elements in the generated Laplacian matrix; and
  a component that applies an eigenvalue decomposition solver to a Laplacian matrix to arrive at the final solution wherein a resulting eigenvector represents a clustering of the objects; and
a processor for executing the computer-executable instructions stored in the memory.

17. A computing device for clustering objects having relationships, comprising:
a data store having a Laplacian matrix representation of a graph with vertices representing the objects and edges representing the relationships;
a memory storing computer-executable instructions of:
  a component that applies an eigenvalue decomposition solver to a Laplacian matrix for a number of iterations;
  a component that identifies stable elements of an eigenvector resulting from the component that applies;
  a component that aggregates elements of a Laplacian matrix corresponding to the identified stable elements;
  a component that generates a Laplacian matrix from the aggregated elements and elements of the previous Laplacian matrix corresponding to the elements not identified as stable; and
  a component that applies an eigenvalue decomposition solver to a Laplacian matrix to arrive at a final solution wherein a resulting eigenvector represents a clustering of the objects; and
a processor for executing the computer-executable instructions stored in the memory
wherein the component that aggregates generates aggregate values so that the subsequent applying of the eigenvalue decomposition solver to the Laplacian matrix results in a second eigenvalue that is the same as the second eigenvalue of the previous Laplacian matrix except for a stable element not being completely stable.

18. A computing device for clustering objects having relationships, comprising:
a data store having a Laplacian matrix representation of a graph with vertices representing the objects and edges representing the relationships;
a memory storing computer-executable instructions of:
  a component that applies an eigenvalue decomposition solver to a Laplacian matrix for a number of iterations:
  a component that identifies stable elements of an eigenvector resulting from the component that applies;
  a component that aggregates elements of a Laplacian matrix corresponding to the identified stable elements
  a component that generates a Laplacian matrix from the aggregated elements and elements of the previous Laplacian matrix corresponding to the elements not identified as stable; and
  a component that applies an eigenvalue decomposition solver to a Laplacian matrix to arrive at a final solution wherein a resulting eigenvector represents a clustering of the objects; and
a processor for executing the computer-executable instructions stored in the memory
wherein a generated Laplacian matrix includes an upper-left sub-matrix, an upper-right sub-matrix, a lower-left sub-matrix, and a lower-right sub-matrix wherein the elements of the upper-left sub-matrix, the upper-right sub-matrix, and the lower-left sub-matrix are aggregated elements based on the identified stable elements of the eigenvector and the previous Laplacian matrix and the elements of the lower-right sub-matrix are the elements of the lower-right sub-matrix of the previous Laplacian matrix for the elements not identified as being stable.

* * * * *

UNITED STATES PATENT AND TRADEMARK OFFICE
CERTIFICATE OF CORRECTION

PATENT NO. : 7,974,977 B2  
APPLICATION NO. : 11/743942  
DATED : July 5, 2011  
INVENTOR(S) : Tie-Yan Liu Page 1 of 1

It is certified that error appears in the above-identified patent and that said Letters Patent is hereby corrected as shown below:

IN THE SPECIFICATIONS:

In column 6, lines 39-40, delete $$\tilde{\xi}_1^T \tilde{\xi}_1 + \tilde{\xi}_2^T \tilde{\xi}_2 = 1, \tilde{\xi}_1^T \tilde{\xi}_1 + \tilde{\xi}_2^T \tilde{\xi}_2 = 1 \Rightarrow \tilde{\xi}_1^T \tilde{\xi}_1 = \tilde{\xi}_1^T \tilde{\xi}_1$$

$$\text{``} \tilde{\xi}_1^T e + \tilde{\xi}_2^T e = 0, \tilde{\xi}_1^T e + \tilde{\xi}_2^T e = 0 \Rightarrow \tilde{\xi}_1^T e = \tilde{\xi}_1^T e \text{''}$$

and insert

-- $\xi_1^T \xi_1 + \xi_2^T \xi_2 = 1, \; \hat{\xi}_1^T \hat{\xi}_1 + \xi_2^T \xi_2 = 1 \;\Rightarrow\; \hat{\xi}_1^T \hat{\xi}_1 = \xi_1^T \xi_1$ $\xi_1^T e + \xi_2^T e = 0, \; \hat{\xi}_1^T e + \xi_2^T e = 0 \;\Rightarrow\; \hat{\xi}_1^T e = \xi_1^T e$ --, therefor.

IN THE CLAIMS:

In column 13, line 23, in Claim 17, delete "objiects" and insert -- objects --, therefor.

In column 14, lines 16-17, in Claim 18, delete "iterations:" and insert -- iterations; --, therefor.

In column 14, line 21, in Claim 18, delete "elements" and insert -- elements; --, therefor.

In column 14, line 29, in Claim 18, delete "objiects;" and insert -- objects; --, therefor.

Signed and Sealed this  
Fourteenth Day of February, 2012

David J. Kappos  
*Director of the United States Patent and Trademark Office*